US012698963B2

(12) United States Patent
Darwin

(10) Patent No.: US 12,698,963 B2
(45) Date of Patent: Aug. 4, 2026

(54) HETERODYNING OPTICAL PHASE MEASURING DEVICE FOR DIFFRACTION BASED OVERLAY

(71) Applicant: Nanoverse Technologies, LTD., Beaverton, OR (US)

(72) Inventor: Michael J. Darwin, Portland, OR (US)

(73) Assignee: NANOVERSE TECHNOLOGIES, LTD., Beaverton, OR (US)

( * ) Notice: Subject to any disclaimer, the term of this patent is extended or adjusted under 35 U.S.C. 154(b) by 5 days.

(21) Appl. No.: 18/187,585

(22) Filed: Mar. 21, 2023

(65) Prior Publication Data

US 2023/0296374 A1     Sep. 21, 2023

Related U.S. Application Data

(60) Provisional application No. 63/269,653, filed on Mar. 21, 2022.

(51) Int. Cl.
*G01B 11/27* (2006.01)

(52) U.S. Cl.
CPC ................................. *G01B 11/272* (2013.01)

(58) Field of Classification Search
CPC ..................................................... G01B 11/272
See application file for complete search history.

(56) References Cited

U.S. PATENT DOCUMENTS

| | | | | |
|---|---|---|---|---|
| 6,738,511 | B1 * | 5/2004 | Farrell ............... | G01B 9/02083 382/172 |
| 2018/0293790 | A1 * | 10/2018 | Darwin .................. | G06T 17/05 |
| 2019/0094702 | A1 * | 3/2019 | Shmarev ........... | G03F 7/706831 |
| 2020/0408511 | A1 * | 12/2020 | Darwin .............. | G01B 11/2513 |
| 2021/0025695 | A1 * | 1/2021 | Li ............................ | G06N 3/04 |

* cited by examiner

*Primary Examiner* — Jamil Ahmed
(74) *Attorney, Agent, or Firm* — McCoy Russell LLP

(57) ABSTRACT

Methods and systems are provided for diffraction-based overlay (DBO) metrology of a multilayered sample. In one example, a method may include generating spatially structured light via a light source and an optical modulator, transmitting the spatially structured light onto the multilayered sample, detecting diffracted spatially structured light at one or more of a plurality of sensors, and estimating an overlay error of the multilayered sample based on the diffracted spatially structured light detected at the one or more of the plurality of sensors.

13 Claims, 10 Drawing Sheets

HETERODYNING OPTICAL PHASE MEASURING DEVICE FOR DIFFRACTION BASED OVERLAY

CROSS REFERENCE TO RELATED APPLICATION

The present application claims priority to U.S. Provisional Application No. 63/269,653, entitled "HETERODYNING OPTICAL PHASE MEASURING DEVICE FOR DIFFRACTION BASED OVERLAY", and filed on Mar. 21, 2022. The entire contents of the above-listed application are hereby incorporated by reference for all purposes.

TECHNICAL FIELD

Embodiments of the disclosed technology are generally directed to methods, techniques, systems, and apparatuses for measuring overlay errors via diffraction based overlay (DFO) metrology.

BACKGROUND/SUMMARY

Electronic devices composed of many layered structures, such as semiconductor devices, may be formed through various manufacturing steps. Throughout the various steps implemented during semiconductor manufacturing, metrology processes may be used to ensure accuracy in implementation of the processing of multilayered samples. A typical form of metrology that may be used to characterize semiconductor device manufacturing is optical metrology, due to the speed of characterization and minimal invasiveness. A number of optical metrology based techniques including scatterometry, diffractometry, and reflectometry implementations and associated analysis algorithms, among others, may be commonly used to characterize critical dimensions such as film thicknesses, composition, overlay, pitch and other parameters of nanoscale structures.

During the fabrication process, the relative position of structures in different layers of the multilayered sample may become offset. Such offset errors are referred to as overlay errors. Minimizing overlay errors may be desirable, as the functionality of the multilayered sample may be compromised if the overlay errors are too great.

Overlay errors may be typically evaluated based on measurements of specialized target structures formed at various locations on the multilayered sample by a lithography tool. The target structures may take many forms, such as a box in box structure. In this form, a box is created on one layer of the multilayered sample and a second, smaller (or larger) box is created on another layer. The localized overlay error is measured by comparing the alignment between the centers of the two boxes. Such measurements are typically taken in the "streets" of the wafer where target structures are generated and used for process control and performance validations. Overlay error is most often measured during the photolithographic process, just after the resist develop step, in order to reduce the likelihood of a misaligned etch step; the patterned resist overlay error is measured with respect the underlying patterned film stack. If the overly error is too large, often a wafer may be reworked by stripping the resist off and reprocessing through the photolithographic process steps with equipment that meets the process steps overlay requirements. Sometimes, the post etch overlay error is also monitored to validate the integrated process.

There are several example methods for measuring the overlay error of a multilayered sample. On such example is image-based overlay (IBO). Conventional IBO metrology may include an analysis of images of the specialized target structures to estimate overlay error. Typically, the image analysis involves the recognition of specific target features (e.g., line segments, boxes, etc.) in the image and overlay error is calculated based on relative locations of these features. The specialized target structures may be specific to the image processing algorithm. For example, the line segments associated with the overlay target (e.g., box-in-box target, frame-in-frame target, advanced imaging metrology (AIM) target) may be specifically designed to comply with the specifics of the algorithm. For this reason, traditional image based overlay metrology analysis algorithms may not perform reliably with arbitrary overlay targets or device structures.

Another example method for measuring the overlay error on a multilayered sample is diffraction-based overlay (DBO). Similar to IBO measurements, diffraction-based overlay (DBO) measurements, and variants thereof, may measure directly or indirectly the overlay error of a multilayered sample. Direct measurements typically estimate the location or intensities of the diffracted orders, usually limited to the zeroth and first order, and use various calibration schemes to refine the accuracies of said measurements. In one example, a multilayered sample may include a first periodic structure in a first layer, and a second periodic structure in a second layer, the second periodic structure positioned on top of the first periodic structure. By illuminating the multilayered sample at specific wavelengths and measuring the intensity of the resultant diffraction pattern as generated by the first and second structures superimposed on each other, a measure for the overlay error may be obtained. A constant programmed overlay offset between the first and second grating may also be used as a method to reduce the influence of the multi-layer film stack optical properties on the true overlay error. Other DBO measurement variants may use modeling algorithms to extend the usable range over which the diffracted information may be analyzed; such approaches include analysis of the spectral content and a fit to an idealized model to estimate the overlay error.

However, several challenges exist with the above metrology techniques. In the case of conventional IBO metrology, algorithms for analyzing the image data may be used in order to interpret the images obtained from the target structure, in order to infer features of the structure, such as edges, line segments, and so on. These image analysis algorithms may be target structure specific, reducing the flexibility of the method. Additionally, IBO metrology may utilize a certain minimum pitch spacing to be optically resolvable, as compared to conventional DBO, which does not utilize a minimum resolvable pitch spacing in order to measure the overlay error.

Errors in current IBO and DBO approaches, direct and modeled, scale with wavelength (2) and numerical aperture (NA), which results in a to push to higher NA or lower 2 for instrumentation. The challenges of bright field (BF) high NA systems may be numerous, especially when considering the working distance (WD) and depth of field (DOF) specifications. Normal axis BF instruments may have quite high NA's (some greater than 0.8), but result in small WD and extremely tight DOF; these constraints ultimately limit the production machines' throughput. Off-axis BF systems, similar to spectroscopic ellipsometers, may increase the effective NA of the illumination, and mitigate some of the challenges associated with high NA imaging objectives;

however, this gain is subsequently limited by the effective DOF and spot size of the receiving optics. Spot size is a central variable in overlay measurements, as it subsequently determines the minimum size of the target feature which determines the overall signal to noise of the measurement. Wavelength scaling produces its own challenges, as pushing optics below 450 nm introduces aberrations, absorption, and other unwanted system errors, increasing design and part cost undesirably.

To address the challenges described above, a method that may operate on small targets, with a numerical aperture and wavelength range that control design cost while enhancing performance is desired. Likewise, eliminating modelling the optical response will result in more robust measurement, simpler designs. In one example of the current embodiment, structured light is used to increase the effective NA of the system, without the associated penalty or loss of DOF, while being modulated directly by diffraction structures on the sample. Tuning the diffraction structure, or the structured light, allows for matched conditions in k-space to be achieved. Modulation of the structured light subsequently results in modulation of the diffracted orders, and when combined with wavelength specific illumination, results in a direct measure of the relative displacement of the diffracted image with respect to the structured light as a function of wavelength.

In one example, the issues described above may be addressed by a method comprising: generating spatially structured light from a light source by projecting light emitted from the light source through an optical modulator, transmitting the spatially structured light from the optical modulator onto a multilayered periodic sample, detecting diffracted spatially structured light from the multilayered periodic sample at one or more of a plurality of sensors, the plurality of sensors communicatively coupled to a computing system, and estimating an overlay error of the multilayered periodic sample based on signals received at the computing system of the diffracted spatially structured light detected at the one or more of the plurality of sensors. In particular, the disclosed technology provided herein generally provides systems and methods that may utilize mixing of the periodicity of the generated structured light with the periodicity of the multilayered sample, leading to a measurable phase and intensity changes which may be compared to a phase and intensity of a reference signal, in order to determine a magnitude of an overlay error.

Additionally, the disclosed technology provided herein allows for several variations, which may be more or less suitable depending on the detection and analysis employed to the diffracted light. In some examples, the structured light may include a fixed spatial period, or a changing spatial period and/or amplitude, with the changing spatial period and/or amplitude showing up in the diffraction signal. Additionally, in some examples, the structured light may include a single wavelength of light, or may include a spectrum of wavelengths, or may be measured as a function of wavelength, which may affect the position of the diffraction peaks. Additionally, in all of the aforementioned examples, the diffracted light may be obtained from either the pupil plane or the image plane, additionally allowing for Fourier analysis in the pupil plane. In yet other examples, the structured light may include crossed spatial variation, in other words, may include a first light beam with a modulated spatial period in one direction, and a second light beam with a modulated spatial period in a second, perpendicular direction, enabling probing of a vector overlay displacement of the overlay structure.

In this way, by utilizing DBO metrology with structured light (e.g., light structured with an optical modulator), heterodyne techniques may be employed in measuring the overlay error of a multilayered sample in a variety of ways, allowing for greater flexibility in the optical detection techniques employed. By using structured light in DBO metrology, more information beyond the position and intensity of the diffraction peak may be obtained, allowing for greater sensitivity in the measurement of overlay errors. The technical effect of employing structured light in DBO metrology is that phase and intensity changes induced by the mixing of the spatial period of the periodic structure and the spatial period of the structured light may be measured.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figures 1, 2:
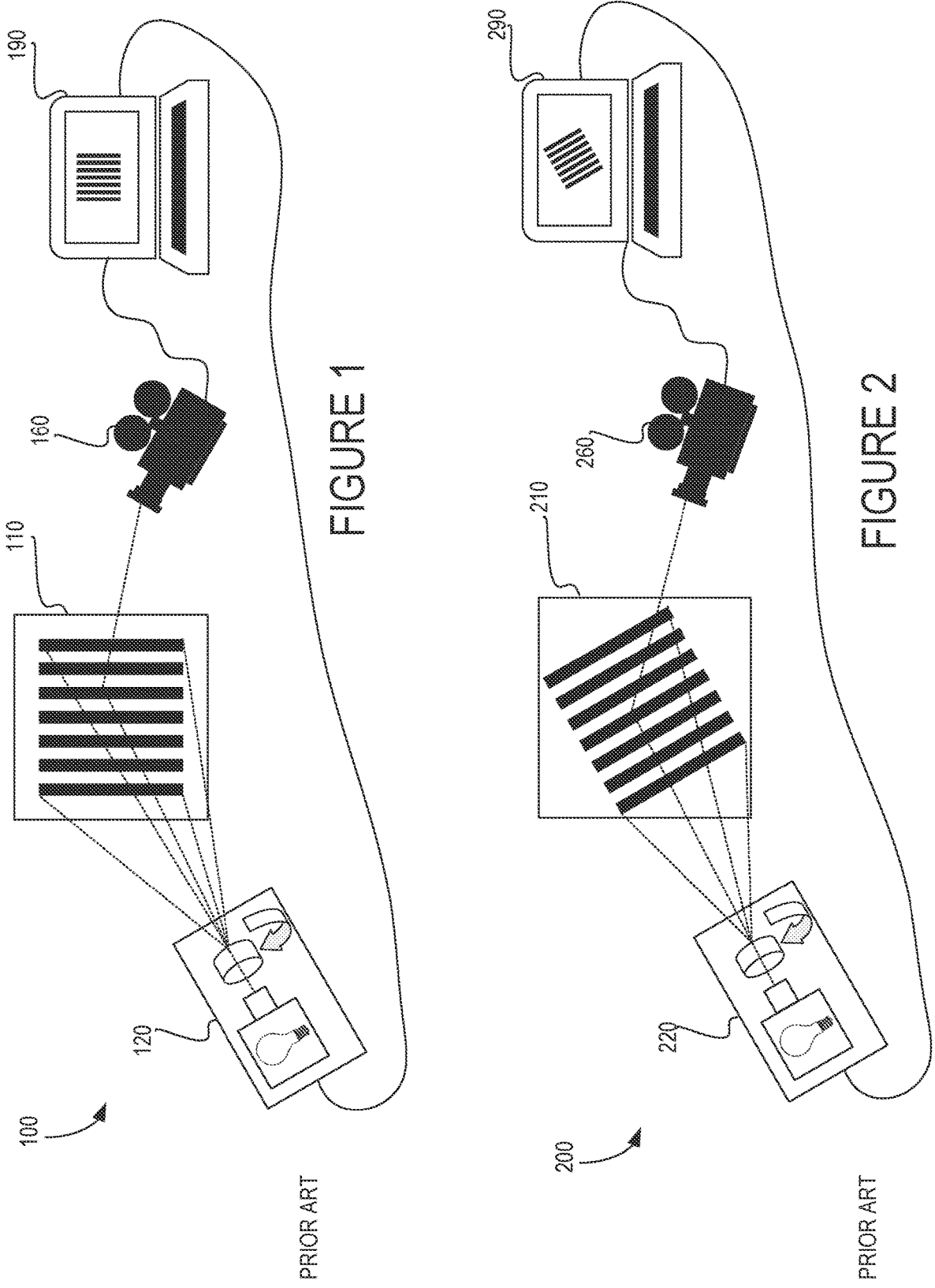
FIG. 1 illustrates a first example 100 of a measuring system in accordance with certain implementations of the disclosed technology.
FIG. 2 illustrates a second example 200 of a measuring system in accordance with certain implementations of the disclosed technology.
Figure 3:
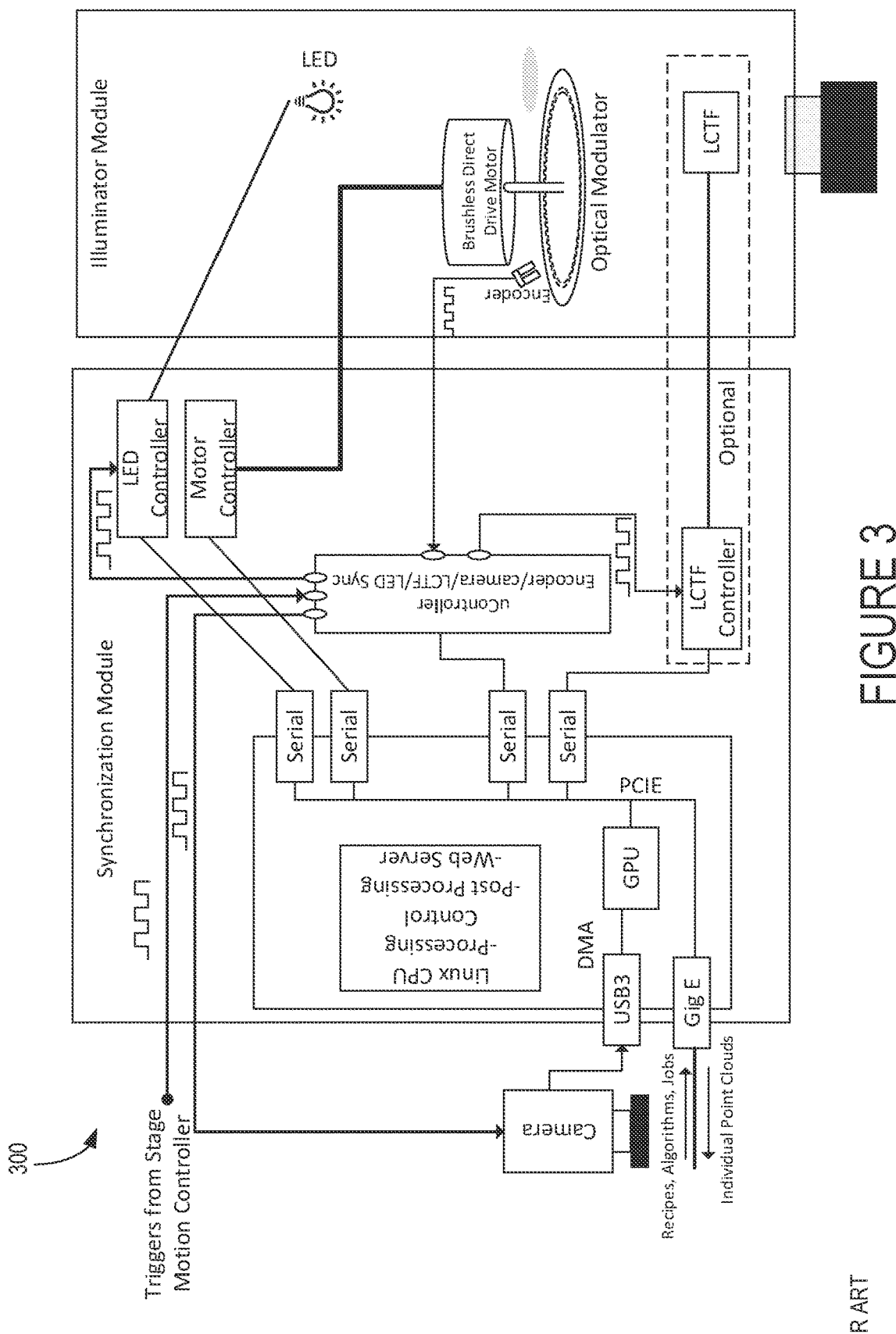
FIG. 3 is a functional diagram 300 illustrating an example of a measuring system in accordance with certain implementations of the disclosed technology.
Figure 4:
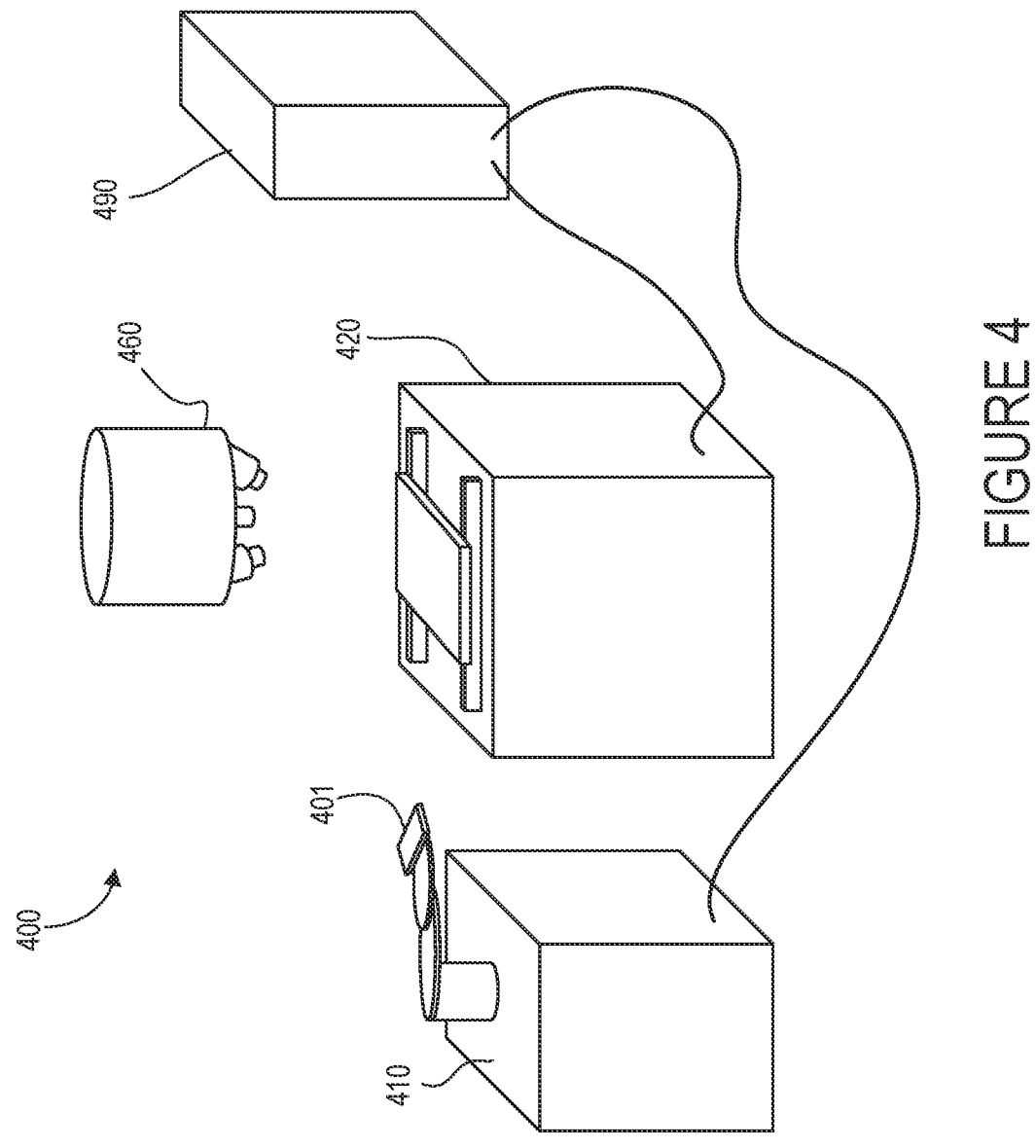
FIG. 4 illustrates a third example 400 of a measuring system in accordance with certain implementations of the disclosed technology.
Figure 5:
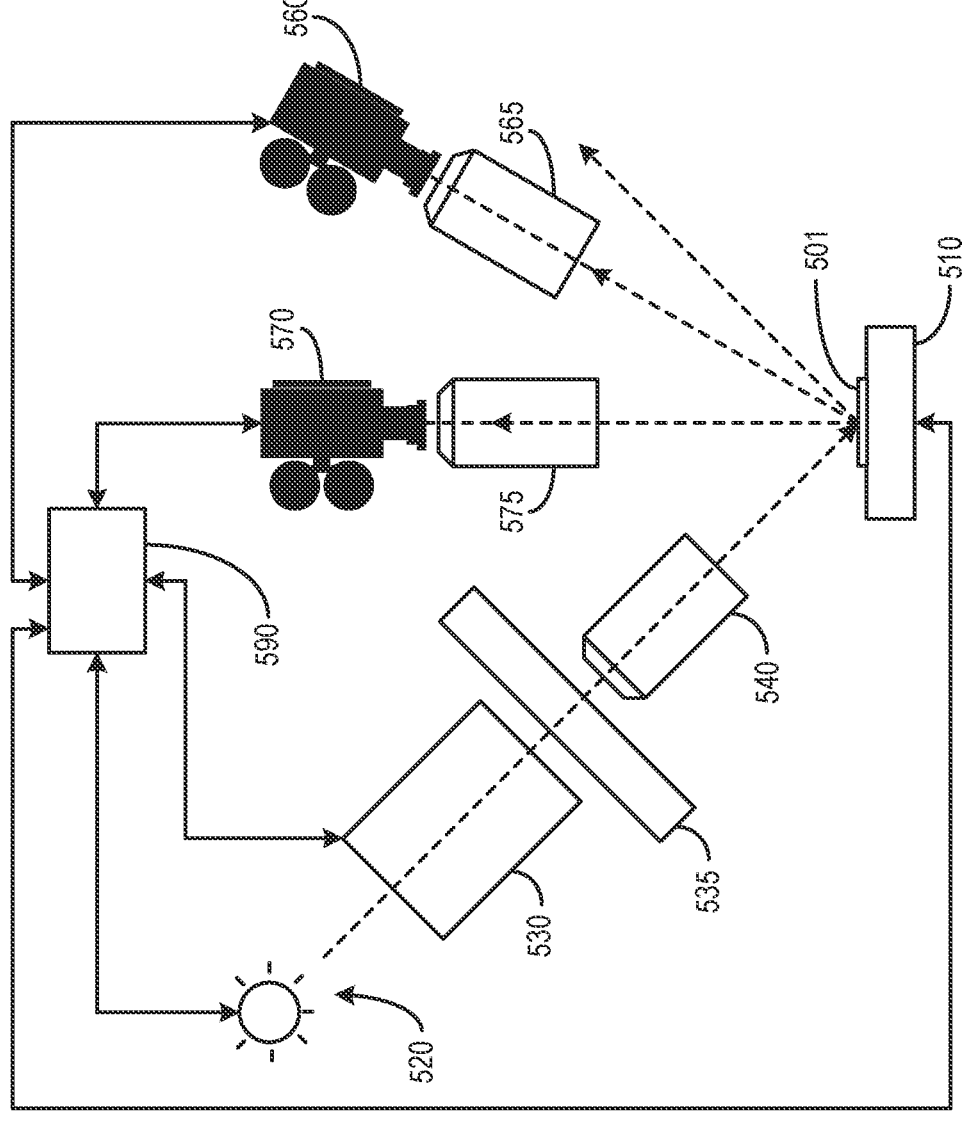
FIG. 5 illustrates a fourth example 500 of a measuring system in accordance with certain implementations of the disclosed technology.
Figure 5:
Figure 6:
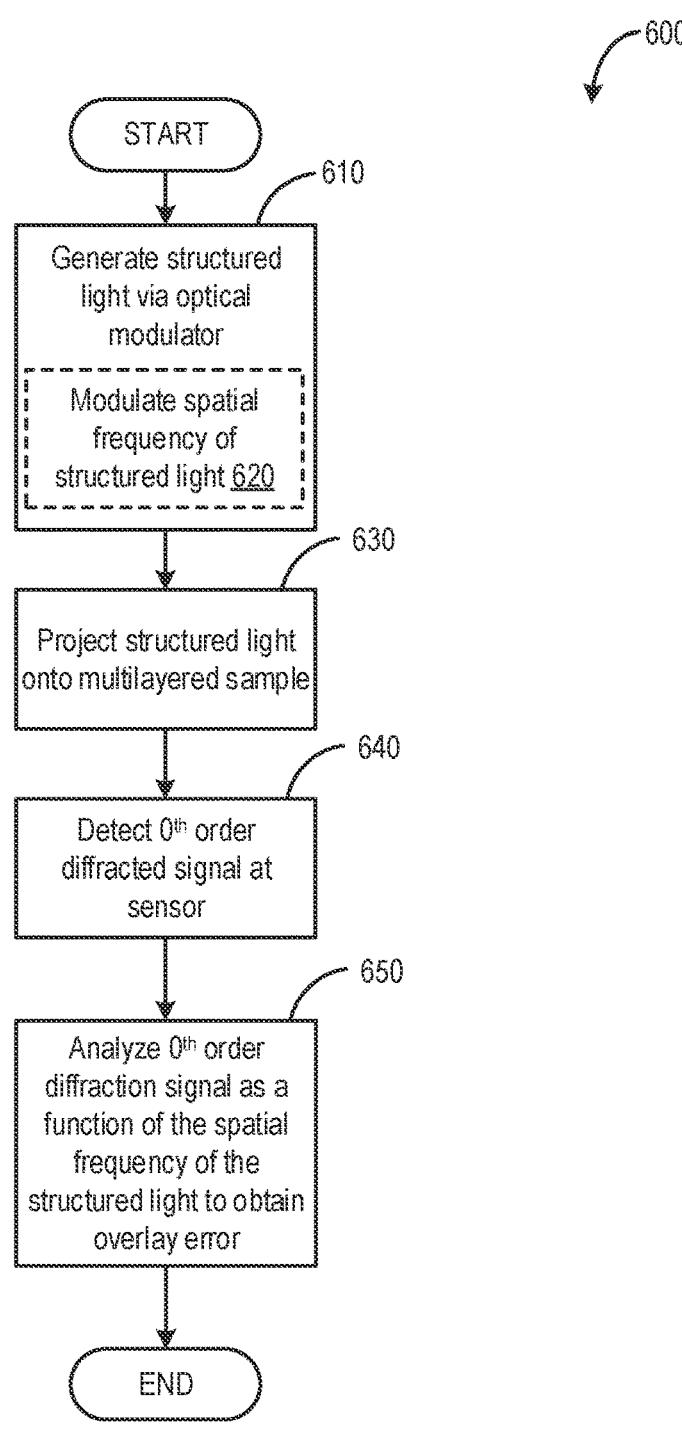
FIG. 6 illustrates an example of a first method 600 for generating structured light in order to image overlay errors in a diffraction based overlay (DFO) sample via analysis of zeroth order diffracted light, in accordance with certain implementations of the disclosed technology.
Figure 7:
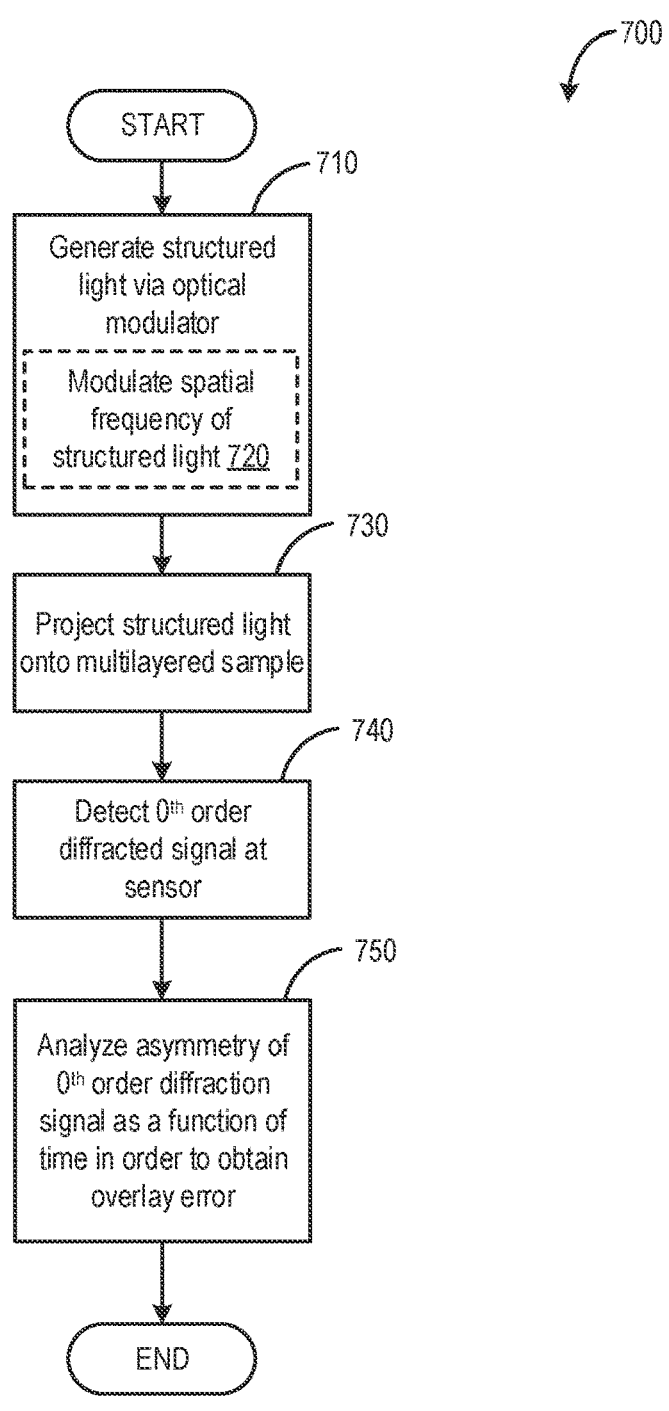
FIG. 7 illustrates an example of a second method 700 for generating structured light in order to image overlay errors in the DFO sample via a time series analysis of zeroth order diffracted light, in accordance with certain implementations of the disclosed technology.
Figure 8:
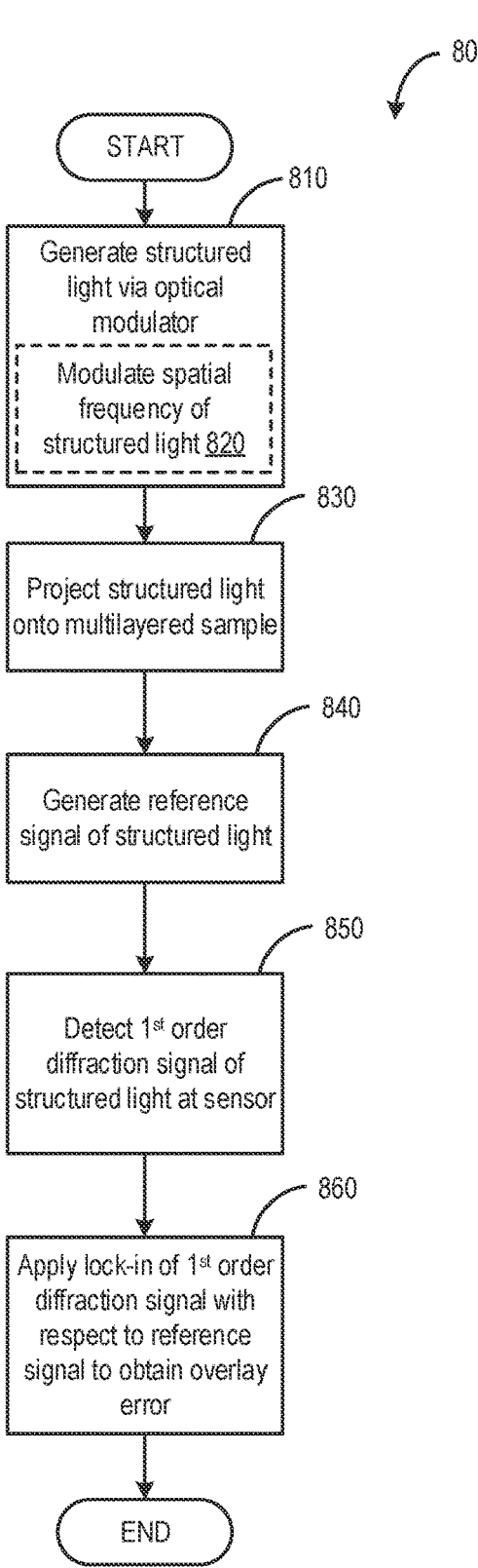
FIG. 8 illustrates an example of a third method 800 for generating structured light in order to image overlay errors in the DFO sample via analysis of first order diffracted light with respect to a reference signal, in accordance with certain implementations of the disclosed technology.
Figure 9:
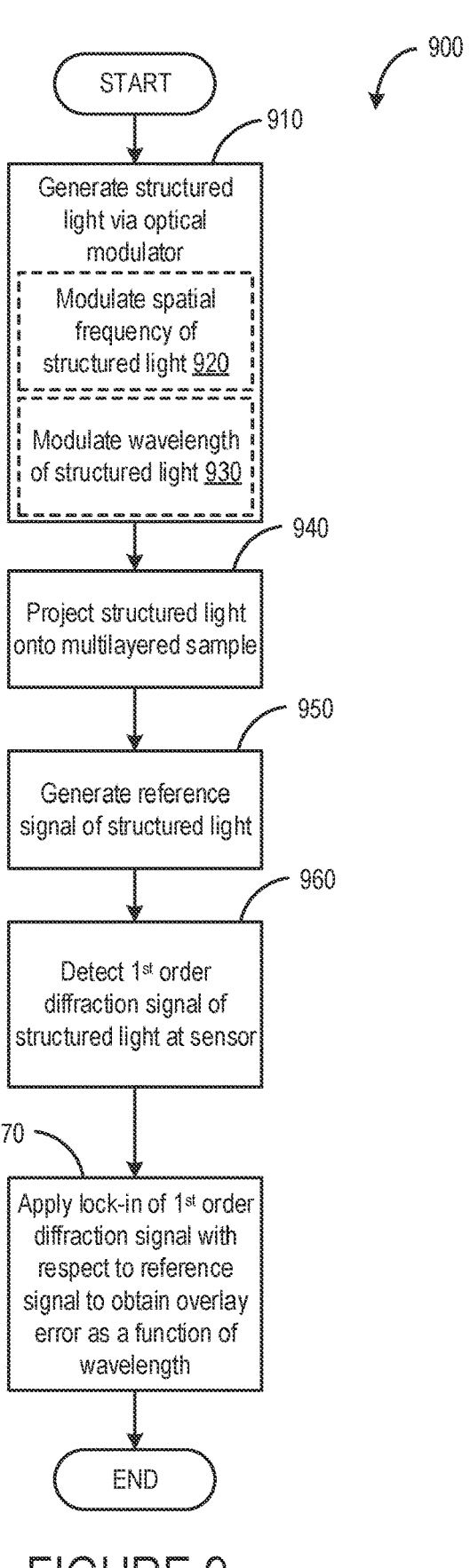
FIG. 9 illustrates an example of a fourth method 900 for generating structured light in order to image overlay errors in the DFO sample via modulating a wavelength of the structured light and analyzing the resultant first order diffraction signal, in accordance with certain implementations of the disclosed technology.
Figure 10:
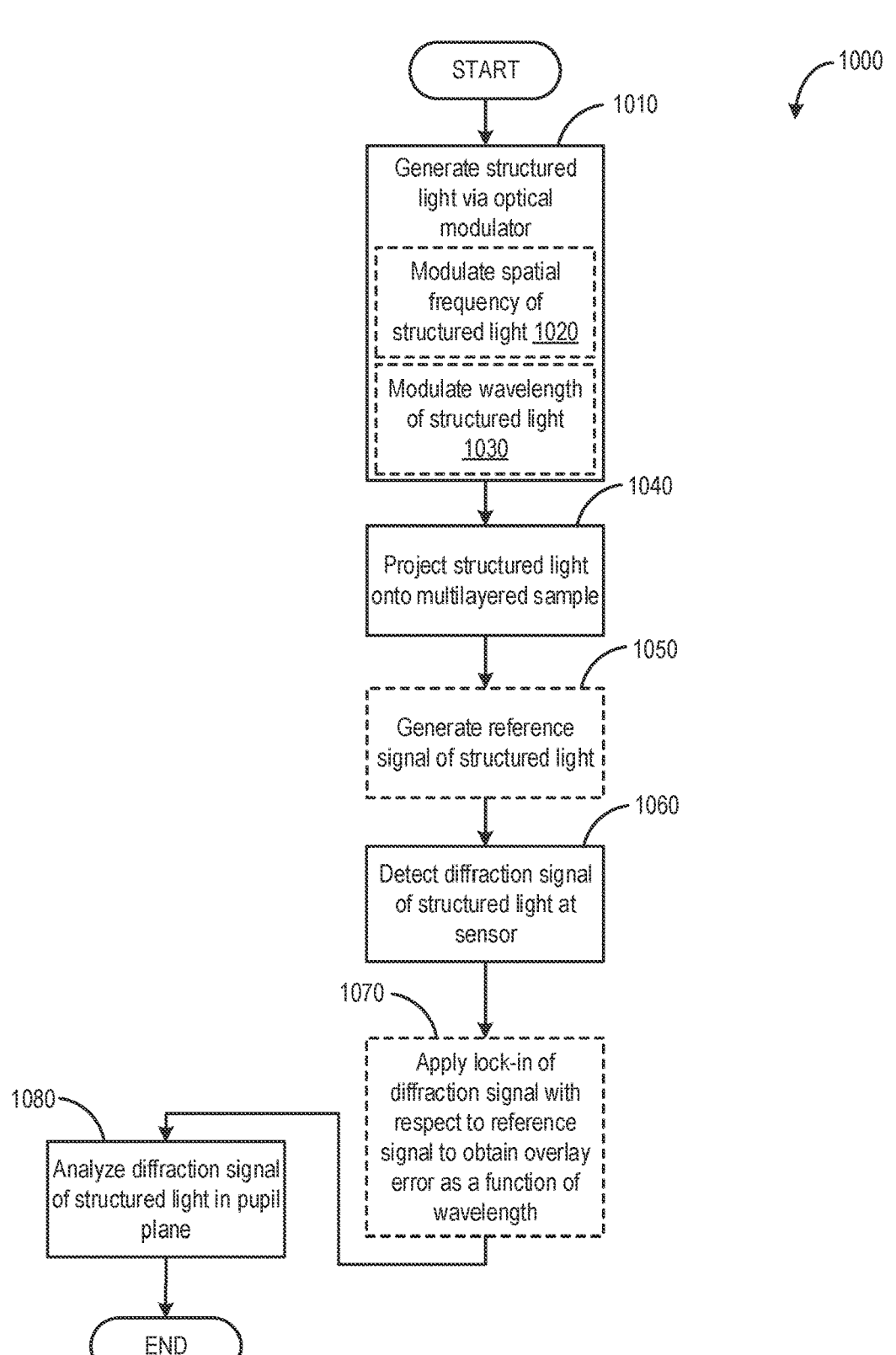
FIG. 10 illustrates an example of a fifth method 1000 for generating structured light in order to image overlay errors in the DFO sample via analysis of diffracted light in a pupil plane, in accordance with certain implementations of the disclosed technology.
Figure 11:
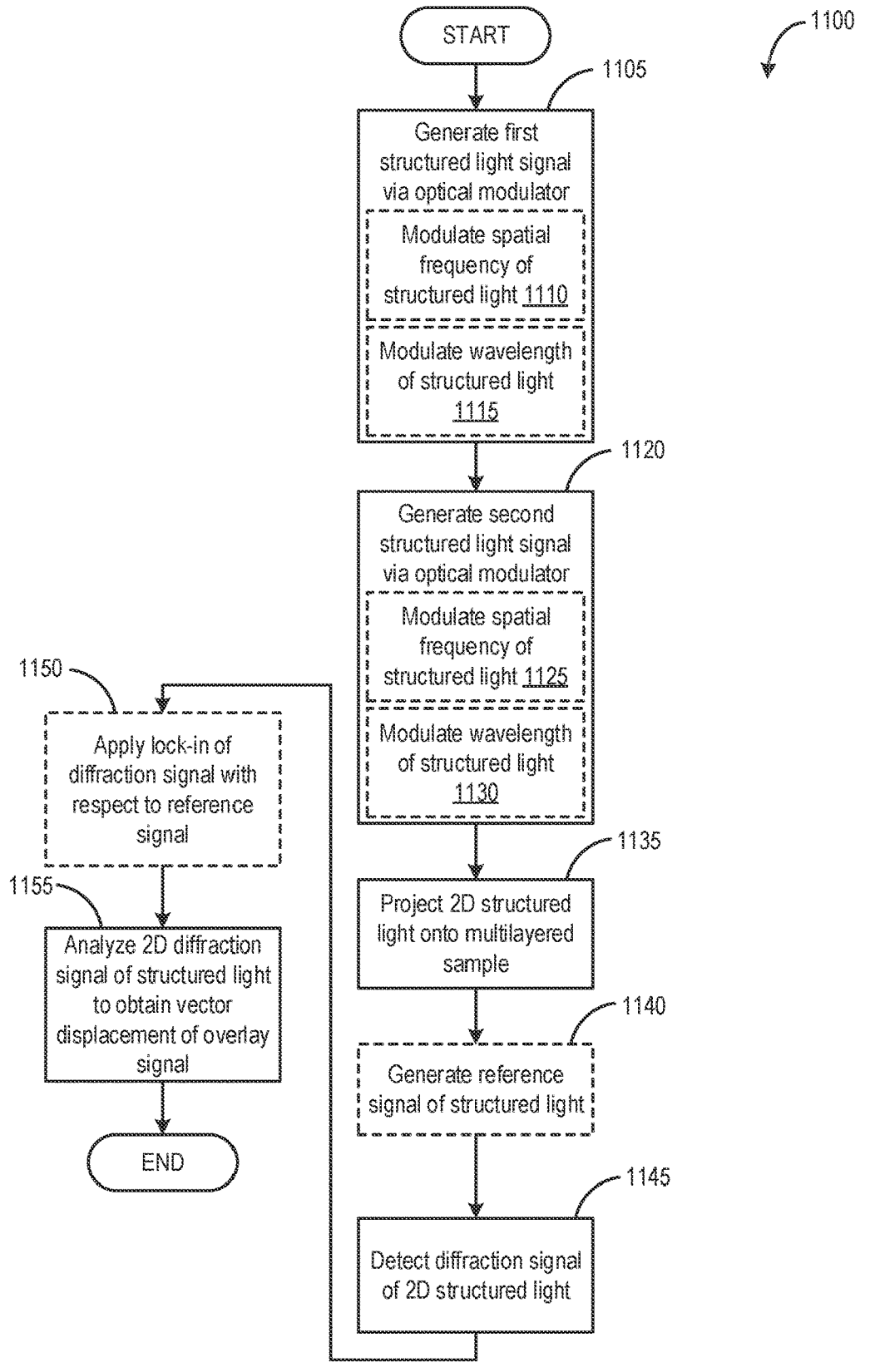
FIG. 11 illustrates an example of a fifth method 1000 for generating a 2D crossed pattern of structured light in order to image overlay errors in the DFO sample, in accordance with certain implementations of the disclosed technology.

Implementations of the disclosed technology generally pertain to methods and apparatuses used for measuring the overlay error of a multilayered sample. Various industries typically rely on overlay error measurements to ensure quality control and sound manufacturing practices of a product and, in some cases, these measurements are integrated into the process flow to ensure that unit level specifications are met for pre-assemblies or integration, for example. In some examples, such samples may include a regular pattern that may be exploited for this purpose. Such a regular pattern may allow for diffraction based overlay (DBO) metrology, whereby the regular pattern on the substrate may act as a diffraction grating, leading to observable diffraction peaks which may provide information about the overlay error in the sample. FIG. 1 shows a first example measuring system to measure a multilayered sample, which may generate structured light for use in DBO metrology; FIG. 2 shows a second example measuring system which similar to FIG. 1, but which is able to measure the sample offset by an arbitrary angle with respect to the structured light. While generating structured light, it may be desirable to employ spatial modulation of the structured light via an optical modulator. FIG. 3 shows an example functional diagram of a measuring system, including an optical modulator, for generating spatially modulated structured light, and measuring the outgoing structured light from the multilayered sample surface. FIG. 4 shows a third example measuring system, including a sample positioning apparatus. FIG. 5 shows a fourth example measuring system, including an optical modulator, and a positioning apparatus of the sample, among other features. The systems of FIGS. 1-5 may be used in order to generate structured light and then measure the diffracted structured light from the sample surface. FIG. 6 shows a first example method for generating and measuring the $0^{th}$ order diffraction signal of structured light from the sample surface. FIG. 7 shows a second example method for generating and measuring the $0^{th}$ order diffraction signal of structured light from the sample surface via a time series analysis. FIG. 8 shows a third example method for generating and measuring the $1^{st}$ order diffraction signal of structured light from the sample surface via a time series analysis, with respect to a reference signal, FIG. 9 shows a fourth example method for generating and measuring the $1^{st}$ order diffraction signal of structured light from a sample surface as a function of wavelength. FIG. 10 shows a fifth example method for generating and measuring a diffraction signal of structured light (could be $0^{th}$ or higher orders) from the sample surface in the pupil plane. FIG. 11 shows a sixth example method for generating and measuring a diffraction signal of structured light (could be $0^{th}$ or higher orders) from the sample surface, the structured light including spatial modulation in two perpendicular directions (also referred to herein as crossed spatial variation).

FIG. 1 illustrates a first example of a measuring system 100 in accordance with certain implementations of the disclosed technology. In the example, the system 100 includes a light source 120 capable of generating structured light that is projected onto a sample area 110. In some examples, the light may be projected directly onto the sample area 110. In other examples, it may be desired to configure the light source 120 to generate rotating, structured light that is projected onto the sample area 110. The structured light, as projected onto the sample area 110, may be measured by a first sensor 160. A second sensor may be used to measure the angular position of the structured light. The data from the first sensor 160 and the second sensor may be collected and passed to a computing system 190. In examples where the light generated by the light source 120 is rotating, the computing system 190 will have the ability to synchronize the angular position as measured by the second sensor with the data acquired by the first sensor 160. The computing system 190 may also be configured to store and analyze data.

FIG. 2 illustrates a second example of a measuring system 200 in accordance with certain implementations of the disclosed technology. Similar to the system 100 of FIG. 1, the system 200 includes a sample area 210, a light source 220, a first sensor 260, and a computing system 290. However, with regard to system 200, the projected structured light has been shown to be rotated to an arbitrary angle with its subsequent data representation shown on the computing system 290. It will be appreciated that the structured light can be rotated to arbitrary, discrete angles or rotated continuously. Regardless, data from the first sensor 260 and the second sensor may be synchronized.

FIG. 3 is a functional diagram 300 illustrating an example of a measuring system in accordance with certain implementations of the disclosed technology. The example includes a synchronization module and an illuminator module.

Certain implementations of the disclosed technology generally include a large, diffusely scattering surface, e.g., to remove any hot spots or optical non-uniformity from the light source. The size of this surface is typically directly proportional to the size and curvature of the sample, thus allowing all angles of the sample surface to be illuminated simultaneously, e.g., without any hot spots. The sample and the observing sensor may be geometrically configured such that the sensor may image the diffusely scattered, spatially modulated light from the sample surface. This spatially modulated light can be transformed into phase and subsequently surface height.

A spatially modulated light source may be used, as well as a diffusely reflecting screen (e.g., having a flat or curved surface). The screen may be illuminated off axis. A sample may be staged with automation to manipulate the sample (e.g., by rotation). A sensor (e.g., an area scan camera) may have optics to image the surface of the sample object. The camera and optics may be set up in such a way to observe the diffusely reflected light form the sample surface. Data may be collected in a first sample orientation, the sample may be rotated (e.g., at least 90 degrees), and data may be collected again.

FIG. 4 illustrates a third example 400 of a measuring system in accordance with certain implementations of the disclosed technology. The system 400 includes a sample positioning apparatus 410 configured to position a sample 401. The sample positioning apparatus 410 may be a robot or other automated apparatus having one or more axis for picking, placing, and/or aligning the sample 401, for example. The system 400 also includes a staging apparatus 420 that may have one or more axis for positioning the sample 410 before and/or during the measurement. The system 400 also includes a measurement apparatus 460 for measuring dimensions, topography, and characteristics of the sample 401, for example. The system 400 also has a computing system 490 that may be configured to synchronize motion, measurement, and/or analysis, for example.

FIG. 5 illustrates a fourth example 500 of a measuring system in accordance with certain implementations of the disclosed technology. The system includes a sample positioning apparatus 510, at least one light source 520, a wavelength selecting device 530, an optical modulator 535, a first lens element 540, a first sensor 560, a second lens element 565, a second sensor 570, a third lens element 575, and a computing system 590. The system also includes a projection surface 550 configured to receive projected light. The sample positioning apparatus 510 is generally configured to position a sample 501.

In some embodiments, the light source 520 is configured to shine light through the wavelength selecting device 530, through the optical modulator 535, to project structured light onto the sample 501 through the first lens element 540. The light source 520 may have projection optics that are capable of generating and rotating structured light, for example. In certain embodiments, the light source 520 may be selected from a group including: a light emitting diode (LED), a laser, a plasma source, and a filament source.

In certain embodiments, the system has multiple light sources, including the light source 520 that are configured to eliminate any null conditions. These multiple light sources may be configured to shine light at different widths, spatial frequencies, and angle of incidence to extend dynamic range, eliminate phase errors, or enhance sensitivity.

In some embodiments, one or more specific wavelengths may be selected by using a wavelength selecting device 530 such as a grating, liquid crystal, acousto-optic transmission filter, or tunable laser source.

In some embodiments, the optical modulator 535 includes an encoder that is configured to cause a pattern to be created by the structured light that is shined by the light source 520 onto the sample 501. The surface of the sample 501 may be shiny, e.g., the sample 501 may be made of glass.

In some embodiments, the second lens element 565 may be configured to resolve light that is distorted, reflected, and/or diffracted from the surface of the sample 501, before being received at the first sensor 560. Similarly, the third lens element 575 may be configured to resolve light that is distorted, reflected, and/or diffracted from the surface of the sample 501, before being received at the second sensor 570.

In some embodiments, an optical sensor apparatus includes at least the first sensor 560 and the second sensor 570, and is configured to capture an image of the sample 501 following receiving light transmitted through each of the second lens element 565 and the third lens element 575, respectively. The optical sensor apparatus may include an array of more than one sensor selected from a group including: a CMOS sensor, a photodetector, a photomultiplier tube (PMT), and a charged coupled device (CCD). The surface of the sample 501 may act to distort, reflect, or diffract the structured light, and each of the first sensor 560 and the second sensor 570 may read this distorted, reflected, or diffracted light, for example. In particular, the first sensor 560 may be configured to detect diffracted light from the sample 501 that is a $0^{th}$ order diffraction signal, while the second sensor 570 may be configured to detect diffracted light from the sample that is a $1^{st}$ order diffracted sample.

In some embodiments, the measuring system may further include a beam splitter (not shown) placed in between the sample 501 and the first lens element 540, such that structured light generated from the optical modulator 535 may pass through the lens element, and through the beam splitter, with a first portion of the light transmitting through the beam splitter and reaching the sample, and a second portion reflecting off of the beam splitter, reflecting off of a reference surface (not shown), transmitting through a fourth lens element (not shown), and being detected at a third sensor (not shown). In one example, the reference surface may be a flat mirror, with the surface of the flat mirror being within a pre-calibrated level of flatness. In one example, a 50/50 beam splitter may be chosen to balance the transmission and reflection optical power; however other beam splitting ratios may be chosen with consideration to the sample 501 under measure. In some examples, the second sensor may be one of the following: a CMOS sensor, a photodetector, a photomultiplier tube (PMT), and a charged coupled device (CCD).

The computing system 590 includes a synchronization module that is configured to phase lock the system by coordinating at least one light source 520, the first sensor 560, and/or the second sensor 570, in addition to any other associated sensors (such as a third sensor). In further examples, the computing system 590 may employ lock-in amplification of the at least one light source 520, the first sensor 560, and/or the second sensor 570, in addition to other associated sensors. The computing system 590 further includes an analysis module that is configured to compute an overlay value based on the received from the projection surface 550 and the sample 501.

In certain embodiments, the first sensor 560 may be coupled with the sample positioning apparatus 510, e.g., by way of a table. In alternative implementations, the first sensor 560 may be physically separate from the sample positioning apparatus 510.

Similarly, in certain embodiments, the second sensor 570 may also be coupled with the sample positioning apparatus 510, e.g., by way of a table. In such embodiments, the second sensor 570 may be adjusted in coordination with the first sensor 560, or may be adjusted independently of the first sensor. In alternative implementations, the first sensor 560 may be physically separate from the sample positioning apparatus 510.

FIG. 6 shows a first method 600 for generating and measuring structured diffracted light from an optical measuring system, such as the optical measuring system of FIG. 5, in order to measure an overlay error of a multilayered sample (such as the sample 501 of FIG. 5), which may have periodic structure. Method 600 will be described in reference to the system described herein and with regard to FIG. 5, but it should be understood that similar methods may be applied to other systems without departing from the scope of this disclosure. Method 600 may be carried out and may be stored at a computing system 590 in non-transitory memory. Instructions for carrying out method 600 may be executed by the computing system 590 in conjunction with signals received from sensors of the optical system, such as the sensors described above with reference to FIG. 5. The computing system may employ actuators of the optical system to adjust operation of the optical system, according to the methods described below.

At 610, method 600 includes generating structured light via an optical modulator (such as the optical modulator 535 of FIG. 5). Light may first be emitted via a light source (such as light source 520 of FIG. 5), the optical modulator, and then through a lens element (such as first lens element 540 of FIG. 5). The optical modulator may impart a fixed spatial period (or frequency) on the light emitted from the light source. In one example, the frequency may be selected based on known or expected properties of a multilayered sample, such as the periodicity of one or more layered structures of the multilayered sample.

At 620, method 600 optionally includes modulating the spatial period of the structured light via the optical modulator. In some examples, the spatial period may be adjusted via periodically adjusting the spatial period between a first, lower spatial period, and a second, higher spatial period. In other examples, the spatial period may be adjusting via periodically adjusting the amplitude of the structured light between a first, lower amplitude, and a second, higher amplitude. In yet other examples, the spatial period of the structured light may be modulated by adjusting directly the spatial period of the structured light and by adjusting the amplitude of the structured light, in certain combinations.

At 630, method 600 includes projecting the structured light onto the multilayered sample. The light may be projected from the light source, through the optical modulator, and through the lens element to impinge on the multilayered sample. In one example, the light projection onto the sample and subsequent collection at a sensor (such as first sensor 560 of FIG. 5) may be configured in a bright field illumination configuration.

At 640, method 600 includes detecting the $0^{th}$ order diffraction signal at a sensor (such as first sensor 560 of FIG. 5). Light may distort, reflect, and/or diffract off of the sample, pass through another lens element (such as second lens element 565 of FIG. 5), to be received at the sensor. In particular, light impinging on the multilayered sample may be diffracted by the one or more periodic structures of the multilayered sample, and the sensor may be positioned to detect the diffracted structured light. The electric field of the structured light will be modulated by the periodic spatial variation of the multilayered sample's permittivity, which may then impart a phase change onto the diffracted structured light, with the phase change dependent on the periodicity of the multilayered sample's permittivity. For example, for a layered sample including a first periodic layer, and a second periodic layer of the same periodicity, but offset from the first periodic layer by a constant amount (in other words, containing an overlay error), the diffracted structured light will obtain a phase change proportional to the overlay error. By comparing the phase of the diffracted structured light to a reference (for example, the phase of the structured light prior to being diffracted by the multilayered sample), the overlay error may be obtained. In some examples, the periodicity of the structured light may be adjusted as described in 620, in order to regress on the overlay displacement.

At 650, method 600 includes analyzing the $0^{th}$ order diffraction signal as a function of the spatial period of the structured light to obtain the overlay error. Following 650, method 600 may end. As described in 640, the diffracted structured light may include a phase shift proportional to the overlay error, which may then be detected by comparing the phase of the diffracted light with the phase of the reference. Comparison of the diffracted light and the reference light may be enabled via the computing system. In the examples where the spatial period of the structured light is either amplitude modulated, frequency modulated, or both, the resultant phase shift may be measured as a function of the amplitude modulation and or frequency modulation of the structured light.

FIG. 7 shows a second method 700 for generating and measuring structured diffracted light from an optical measuring system, such as the optical measuring system of FIG. 5. Method 700 will be described in reference to the system described herein and with regard to FIG. 5, but it should be understood that similar methods may be applied to other systems without departing from the scope of this disclosure. Method 700 may be carried out and may be stored at a computing system 590 in non-transitory memory. Instructions for carrying out method 700 may be executed by the computing system 590 in conjunction with signals received from sensors of the optical system, such as the sensors described above with reference to FIG. 5. The computing system may employ actuators of the optical system to adjust operation of the optical system, according to the methods described below.

At 710, method 700 includes generating structured light via an optical modulator (such as the optical modulator 535 of FIG. 5). Light may first be emitted via a light source (such as light source 520 of FIG. 5), the optical modulator, and then through a lens element (such as first lens element 540 of FIG. 5). The optical modulator may impart a fixed spatial period (or frequency) on the light emitted from the light source. In one example, the frequency may be selected based on known or expected properties of a multilayered sample, such as the periodicity of one or more layered structures of the multilayered sample.

At 720, method 700 optionally includes modulating the spatial period of the structured light via the optical modulator. In some examples, the spatial period may be adjusted via continually adjusting the spatial period between a first, lower spatial period, and a second, higher spatial period. In other examples, the spatial period may be adjusting via continually adjusting the amplitude of the structured light between a first, lower amplitude, and a second, higher amplitude. In yet other examples, the spatial period of the structured light may be modulated by adjusting directly the spatial period of the structured light and by adjusting the amplitude of the structured light, in certain combinations.

At 730, method 700 includes projecting the structured light onto the multilayered sample. The light may be projected from the light source, through the optical modulator, and through the lens element to impinge on the multilayered sample. In one example, the light projection onto the sample and subsequent collection at a sensor (such as first sensor 560 of FIG. 5) may be configured in a bright field illumination configuration.

At 740, method 700 includes detecting the $0^{th}$ order diffraction signal at the sensor. Light may distort, reflect, and/or diffract off of the sample, pass through another lens element (such as second lens element 565 of FIG. 5), to be received at the sensor. In particular, light impinging on the multilayered sample may be diffracted by the one or more periodic structures of the multilayered sample, and the sensor may be positioned to detect the diffracted structured light. The electric field of the structured light will be modulated by the periodic spatial variation of the multilayered sample's permittivity, which may then impart a phase change onto the diffracted structured light, with the phase change dependent on the periodicity of the multilayered sample's permittivity. For example, for a layered sample including a first periodic layer, and a second periodic layer of the same periodicity, but offset from the first periodic layer by a constant amount (in other words, containing an overlay error), the diffracted structured light will obtain a phase change proportional to the overlay error. By comparing the phase of the diffracted structured light to a reference (for example, the phase of the structured light prior to being diffracted by the multilayered sample), the overlay error may be obtained. In some examples, the periodicity of the structured light may be adjusted as described in 720, in order to regress on the overlay displacement.

At 750, method 700 includes analyzing an asymmetry of $0^{th}$ order diffraction signal detected at the sensor as a function of time in order to obtain the overlay error. The mixing of the spatial frequencies of the structured light with the asymmetry in the multilayered structure will produce an asymmetric periodic signal in the diffracted light signal, which may be analyzed via e.g., a pixel trace of the light signal detected at the sensor. By measuring an asymmetry of the time series signal of the diffracted light, it may be possible to determine a magnitude of the overlay error, in addition to the type of offset between the one or more layers in the multilayered structure. For example, for a layered sample including a first periodic layer, and a second periodic layer of the same periodicity, but offset from the first periodic layer by an overlay error in a first direction, by analyzing the pixel trace of the detected signal at the sensor, the magnitude of the overlay error, as well as the first direction, may be inferred.

FIG. 8 shows a third method 800 for generating and measuring structured diffracted light from an optical measuring system, such as the optical measuring system of FIG. 5. Method 700 will be described in reference to the system described herein and with regard to FIG. 5, but it should be understood that similar methods may be applied to other systems without departing from the scope of this disclosure. Method 800 may be carried out and may be stored at a computing system 590 in non-transitory memory. Instructions for carrying out method 800 may be executed by the computing system 590 in conjunction with signals received from sensors of the optical system, such as the sensors described above with reference to FIG. 5. The computing system may employ actuators of the optical system to adjust operation of the optical system, according to the methods described below.

At 810, method 800 includes generating structured light via an optical modulator (such as the optical modulator 535 of FIG. 5). Light may first be emitted via a light source (such as light source 520 of FIG. 5), the optical modulator, and then through a lens element (such as first lens element 540 of FIG. 5). The optical modulator may impart a fixed spatial period (or frequency) on the light emitted from the light source. In one example, the frequency may be selected based on known or expected properties of a multilayered sample, such as the periodicity of one or more layered structures of the multilayered sample.

At 820, method 800 optionally includes modulating the spatial period of the structured light via the optical modulator. In some examples, the spatial period may be adjusted via systematically and continuously adjusting the spatial period between a first, lower spatial period, and a second, higher spatial period. In other examples, the spatial period may be adjusting via periodically adjusting the amplitude of the structured light between a first, lower amplitude, and a second, higher amplitude. In yet other examples, the spatial period of the structured light may be modulated by adjusting directly the spatial period of the structured light and by adjusting the amplitude of the structured light, in certain combinations.

At 830, method 800 includes projecting the structured light onto the multilayered sample. The light may be projected from the light source, through the optical modulator, and through the lens element to impinge on the multilayered sample. In one example, the light projection onto the sample and subsequent collection at a sensor (such as second sensor 570 of FIG. 5) may be configured in a bright field illumination configuration.

At 840, method 800 includes generating a reference signal of structured light. In some embodiments, the reference signal may be generated numerically via the computing system, and the diffracted light detected at the sensor may be analyzed with respect to the numerically generated reference signal via the computing system. In other embodiments, the reference signal of the structured light may impinge on a reference surface (such as the reference surface described in relation to certain embodiments of FIG. 5). The light reflecting off of the reference surface and the light diffracted from the multilayered sample may have a definite phase relationship, which may be utilized for lock-in amplification, in order to measure the relative phase shift induced by diffraction of the structured light by the multilayered sample.

At 850, method 800 includes detecting a $1^{st}$ order diffraction signal of structured light at the sensor (such as the second sensor 570 of FIG. 5). The overlay target may be designed in such a way such that the $1^{st}$ order diffracted terms carry significant amount of power and directed at a specific angle with respect to the light projected onto the sample. The system of FIG. 5 may be optimized so as to image the $1^{st}$ order terms. Light may distort, reflect, and/or diffract off of the sample, pass through another lens element (such as third lens element 575 of FIG. 5), to be received at the sensor. In particular, light impinging on the multilayered sample may be diffracted by the one or more periodic structures of the multilayered sample, and the sensor may be positioned to detect the $1^{st}$ order diffracted structured light. The electric field of the structured light will be modulated by the periodic spatial variation of the multilayered sample's permittivity, which may then impart a phase change onto the diffracted structured light, with the phase change dependent on the periodicity of the multilayered sample's permittivity. For example, for a layered sample including a first periodic layer, and a second periodic layer of the same periodicity, but offset from the first periodic layer by a constant amount (in other words, containing an overlay error), the diffracted structured light will obtain a phase change proportional to the overlay error. By comparing the phase of the diffracted structured light to the reference signal, the overlay error may be obtained. In some examples, the periodicity of the structured light may be adjusted as described in 820, in order to regress on the overlay displacement.

At 860, method 800 includes applying a lock-in technique of the $1^{st}$ order diffraction signal with respect to the reference signal to obtain overlay error. In embodiments where the reference signal is detected from structured light reflecting off of a reference surface and being detected at another sensor (such as the third sensor as described in relation to FIG. 5), the reference signal may be obtained as time series data, and may be obtained on a pixel-by-pixel basis, for example. The reference signal of the structured light may have a definite phase relationship with the diffracted structured light obtained at the sensor, thereby allowing a signal with the same spatial period and with a definite phase relationship to the reference signal to be obtained via lock-in amplification (such as via computing system 590 of FIG. 5). In particular, the resultant phase shift of the diffracted light obtained at the sensor with respect to the reference signal may be proportional to the overlay error. In examples where the spatial period is modulated, the resultant phase shift may be analyzed as a function of spatial period (e.g., the phase shift may be analyzed in the spatial period domain in the far field), in order to obtain a phase map as a function of spatial period.

FIG. 9 shows a fourth method 900 for generating and measuring structured diffracted light from an optical measuring system, such as the optical measuring system of FIG. 5. Method 900 will be described in reference to the system described herein and with regard to FIG. 5, but it should be understood that similar methods may be applied to other systems without departing from the scope of this disclosure. Method 900 may be carried out and may be stored at a computing system 590 in non-transitory memory. Instructions for carrying out method 900 may be executed by the computing system 590 in conjunction with signals received from sensors of the optical system, such as the sensors described above with reference to FIG. 5. The computing system may employ actuators of the optical system to adjust operation of the optical system, according to the methods described below.

At 910, method 900 includes generating structured light via an optical modulator (such as the optical modulator 535 of FIG. 5). Light may first be emitted via a light source (such as light source 520 of FIG. 5), which may then pass through a wavelength selecting device (such as wavelength selecting device 530 of FIG. 5), the optical modulator, and then through a lens element (such as first lens element 540 of FIG. 5). The optical modulator may impart a fixed spatial period (or frequency) on the light emitted from the light source. In one example, the frequency may be selected based on known or expected properties of a multilayered sample, such as the periodicity of one or more layered structures of the multilayered sample.

At 920, method 900 optionally includes modulating the spatial period of the structured light via the optical modulator. In some examples, the spatial period may be adjusted via continuously and systematically adjusting the spatial period between a first, lower spatial period, and a second, higher spatial period. In other examples, the spatial period may be adjusting via adjusting the amplitude of the structured light between a first, lower amplitude, and a second, higher amplitude. In yet other examples, the spatial period of the structured light may be modulated by adjusting directly the spatial period of the structured light and by adjusting the amplitude of the structured light, in certain combinations.

At 930, method 900 optionally includes varying the wavelength of light. In some examples, one or more specific wavelengths may be selected by using a wavelength selecting device such as a grating, liquid crystal, acousto-optic transmission filter, or tunable laser source. Additionally, by changing the wavelength of light source, the angular position of the various orders of the diffracted light will shift. Modulation of the wavelength from a lower wavelength to a longer wavelength, yields a modulation of the diffracted orders of the layered grating. By varying the wavelength, a change in the amount of power carried in the $0^{th}$ order term may be measured. Similarly, by measuring and/or imaging the $1^{st}$ order diffraction term as a function of wavelength, the apparent position of the overlay structure will appear to shift systematically as a function of wavelength. The relative shift with wavelength provides a self-referencing method for precisely determining the pitch of the overlay target; when combined with the structured light, the lateral displacement may be precisely measured.

In some cases, both the $0^{th}$ order and $1^{st}$ order diffraction modes may be captured within the same field of view. The superposition of these two modes may be measured as a function of varying wavelength and structured light modulation; the structured light providing information about the spatial frequencies present in the image, and the varying wavelength changing the location of the spatial frequencies.

At 940, method 900 includes projecting the structured light onto the multilayered sample. The light may be projected from the light source, through the wavelength selecting device, through the optical modulator, and through the lens element to impinge on the multilayered sample. In one example, the light projection onto the sample and subsequent collection at a sensor (such as second sensor 570 of FIG. 5) may be configured in a bright field illumination configuration.

At 950, method 900 includes generating a reference signal of structured light. In some embodiments, the reference signal may be generated numerically via the computing system, and the diffracted light detected at the sensor may be analyzed with respect to the numerically generated reference signal via the computing system. In other embodiments, the reference signal of the structured light may impinge on a reference surface (such as the reference surface described in relation to certain embodiments of FIG. 5). The light reflecting off of the reference surface and the light diffracted from the multilayered sample may have a definite phase relationship, which may be utilized for lock-in amplification, in order to measure the relative phase shift induced by diffraction of the structured light by the multilayered sample.

At 960, method 900 includes detecting a $1^{st}$ order diffraction signal of structured light at a sensor (such as the second sensor 570 of FIG. 5). The overlay target may be designed in such a way such that the $1^{st}$ order diffracted terms carry significant amount of power and directed at a specific angle with respect to the light projected onto the sample. The system of FIG. 5 may be optimized so as to image the $1^{st}$ order terms. Light may distort, reflect, and/or diffract off of the sample, pass through another lens element (such as third lens element 575 of FIG. 5), to be received at the sensor. In particular, light impinging on the multilayered sample may be diffracted by the one or more periodic structures of the multilayered sample, and the sensor may be positioned to detect the $1^{st}$ order diffracted structured light. The electric field of the structured light will be modulated by the periodic spatial variation of the multilayered sample's permittivity, which may then impart a phase change onto the diffracted structured light, with the phase change dependent on the periodicity of the multilayered sample's permittivity. For example, for a layered sample including a first periodic layer, and a second periodic layer of the same periodicity, but offset from the first periodic layer by a constant amount (in other words, containing an overlay error), the diffracted structured light will obtain a phase change proportional to the overlay error. By comparing the phase of the diffracted structured light to the reference signal, the overlay error may be obtained. In some examples, the periodicity of the structured light may be adjusted as described in 920, in order to regress on the overlay displacement. Additionally, in some examples, the wavelength of the light may be adjusted, such as via the wavelength selecting device, as described in 930, in order to provide an additional parameter for regression on the overlay displacement.

At 970, method 900 includes applying a lock-in technique of the $1^{st}$ order diffraction signal with respect to the reference signal to obtain overlay error. In embodiments where the reference signal is detected from structured light reflecting off of a reference surface and being detected at another sensor (such as the third sensor as described in relation to FIG. 5), the reference signal may be obtained as time series data, and may be obtained on a pixel-by-pixel basis, for example. The reference signal of the structured light may have a definite phase relationship with the diffracted structured light obtained at the sensor, thereby allowing a signal with the same spatial period and with a definite phase relationship to the reference signal to be obtained via lock-in amplification (such as via computing system 590 of FIG. 5). In particular, the resultant phase shift of the diffracted light obtained at the sensor with respect to the reference signal may be proportional to the overlay error. In examples where the spatial period is modulated, the resultant phase shift may be analyzed as a function of spatial period (e.g., the phase shift may be analyzed in the spatial period domain in the far field), in order to obtain a phase map as a function of spatial period. In yet other examples where the wavelength of the structured light is modulated additionally or alternatively to modulation of the spatial period of the structured light, the resultant phase shift may be further analyzed as a function of wavelength, in order to obtain a phase map as a function of wavelength and/or spatial period.

FIG. 10 shows a fifth method 1000 for generating and measuring structured diffracted light from an optical measuring system, such as the optical measuring system of FIG. 5. Method 1000 will be described in reference to the system described herein and with regard to FIG. 5, but it should be understood that similar methods may be applied to other systems without departing from the scope of this disclosure. Method 1000 may be carried out and may be stored at a computing system 590 in non-transitory memory. Instructions for carrying out method 700 may be executed by the computing system 590 in conjunction with signals received from sensors of the optical system, such as the sensors described above with reference to FIG. 5. The computing system may employ actuators of the optical system to adjust operation of the optical system, according to the methods described below.

At 1010, method 1000 includes generating structured light via an optical modulator (such as the optical modulator 535 of FIG. 5). Light may first be emitted via a light source (such as light source 520 of FIG. 5), which may then pass through a wavelength selecting device (such as wavelength selecting device 530 of FIG. 5), the optical modulator, and then through a lens element (such as first lens element 540 of FIG. 5). The optical modulator may impart a fixed spatial period (or frequency) on the light emitted from the light source. In one example, the frequency may be selected based on known or expected properties of a multilayered sample, such as the periodicity of one or more layered structures of the multilayered sample.

At 1020, method 1000 optionally includes modulating the spatial period of the structured light via the optical modulator. In some examples, the spatial period may be adjusted via continuously and systematically adjusting the spatial period between a first, lower spatial period, and a second, higher spatial period. In other examples, the spatial period may be adjusting via adjusting the amplitude of the structured light between a first, lower amplitude, and a second, higher amplitude. In yet other examples, the spatial period of the structured light may be modulated by adjusting directly the spatial period of the structured light and by adjusting the amplitude of the structured light, in certain combinations.

At 1030, method 1000 optionally includes varying the wavelength of light. In some examples, one or more specific wavelengths may be selected by using a wavelength selecting device such as a grating, liquid crystal, acousto-optic transmission filter, or tunable laser source. Additionally, by changing the wavelength of light source, the angular position of the various orders of the diffracted light will shift.

Modulation of the wavelength from a lower wavelength to a longer wavelength, yields a modulation of the diffracted orders of the layered grating. By varying the wavelength, a change in the amount of power carried in the $0^{th}$ order term may be measured. Similarly, by measuring and/or imaging the $1^{st}$ order diffraction term as a function of wavelength, the apparent position of the overlay structure will appear to shift systematically as a function of wavelength. The relative shift with wavelength provides a self-referencing method for precisely determining the pitch of the overlay target; when combined with the structured light, the lateral displacement may be precisely measured.

In some cases, both the $0^{th}$ order and $1^{st}$ order diffraction modes may be captured within the same field of view. The superposition of these two modes may be measured as a function of varying wavelength and structured light modulation; the structured light providing information about the spatial frequencies present in the image, and the varying wavelength changing the location of the spatial frequencies.

At 1040, method 1000 includes projecting the structured light onto the multilayered sample. The light may be projected from the light source, through the wavelength selecting device, through the optical modulator, and through the lens element to impinge on the multilayered sample. In one example, the light projection onto the sample and subsequent collection at a sensor (such as second sensor 570 of FIG. 5) may be configured in a bright field illumination configuration.

At 1050, method 1000 optionally includes generating a reference signal of structured light. In some embodiments, the reference signal may be generated numerically via the computing system, and the diffracted light detected at the sensor may be analyzed with respect to the numerically generated reference signal via the computing system. In other embodiments, the reference signal of the structured light may impinge on a reference surface (such as the reference surface described in relation to certain embodiments of FIG. 5). The light reflecting off of the reference surface and the light diffracted from the multilayered sample may have a definite phase relationship, which may be utilized for lock-in amplification, in order to measure the relative phase shift induced by diffraction of the structured light by the multilayered sample.

At 1060, method 1000 includes detecting a $1^{st}$ order diffraction signal of structured light at a sensor (such as the second sensor 570 of FIG. 5). The overlay target may be designed in such a way such that the $1^{st}$ order diffracted terms carry significant amount of power and directed at a specific angle with respect to the light projected onto the sample. The system of FIG. 5 may be optimized so as to image the $1^{st}$ order terms. Light may distort, reflect, and/or diffract off of the sample, pass through another lens element (such as third lens element 575 of FIG. 5), to be received at the sensor. In particular, light impinging on the multilayered sample may be diffracted by the one or more periodic structures of the multilayered sample, and the sensor may be positioned to detect the $1^{st}$ order diffracted structured light. The electric field of the structured light will be modulated by the periodic spatial variation of the multilayered sample's permittivity, which may then impart a phase change onto the diffracted structured light, with the phase change dependent on the periodicity of the multilayered sample's permittivity. For example, for a layered sample including a first periodic layer, and a second periodic layer of the same periodicity, but offset from the first periodic layer by a constant amount (in other words, containing an overlay error), the diffracted structured light will obtain a phase change proportional to the overlay error. By comparing the phase of the diffracted structured light to the reference signal, the overlay error may be obtained. In some examples, the periodicity of the structured light may be adjusted as described in 1020, in order to regress on the overlay displacement. Additionally, in some examples, the wavelength of the light may be adjusted, such as via the wavelength selecting device, as described in 1030, in order to provide an additional parameter for regression on the overlay displacement.

At 1070, method 1000 optionally includes applying a lock-in technique of the $1^{st}$ order diffraction signal with respect to the reference signal to obtain overlay error. In embodiments where the reference signal is detected from structured light reflecting off of a reference surface and being detected at another sensor (such as the third sensor as described in relation to FIG. 5), the reference signal may be obtained as time series data, and may be obtained on a pixel-by-pixel basis, for example. The reference signal of the structured light may have a definite phase relationship with the diffracted structured light obtained at the sensor, thereby allowing a signal with the same spatial period and with a definite phase relationship to the reference signal to be obtained via lock-in amplification (such as via computing system 590 of FIG. 5). In particular, the resultant phase shift of the diffracted light obtained at the sensor with respect to the reference signal may be proportional to the overlay error. In examples where the spatial period is modulated, the resultant phase shift may be analyzed as a function of spatial period (e.g., the phase shift may be analyzed in the spatial period domain in the far field), in order to obtain a phase map as a function of spatial period. In yet other examples where the wavelength of the structured light is modulated additionally or alternatively to modulation of the spatial period of the structured light, the resultant phase shift may be further analyzed as a function of wavelength, in order to obtain a phase map as a function of wavelength and/or spatial period.

At 1080, method 1000 includes analyzing the diffracted light in the pupil plane. In one example, an objective lens may be placed between the multilayered sample and the sensor, in order to image the light of the pupil plane. Spatial and temporal modulations may be reflected in the pupil plane as a Fourier transform of the signal in the image plane. An inverse Fourier analysis may then be used in order to analyze the induced phase shift as a function of the spatial period of the diffracted structured light, in order to extract the relative overlay error/displacement from the modulated signals.

FIG. 11 shows a sixth method 1100 for generating and measuring structured diffracted light from an optical measuring system, such as the optical measuring system of FIG. 5. Method 1100 will be described in reference to the system described herein and with regard to FIG. 5, but it should be understood that similar methods may be applied to other systems without departing from the scope of this disclosure. Method 1100 may be carried out and may be stored at a computing system 590 in non-transitory memory. Instructions for carrying out method 1100 may be executed by the computing system 590 in conjunction with signals received from sensors of the optical system, such as the sensors described above with reference to FIG. 5. The computing system may employ actuators of the optical system to adjust operation of the optical system, according to the methods described below.

At 1105, method 1100 includes generating a first structured light signal via an optical modulator (such as the optical modulator 535 of FIG. 5). Light may first be emitted via a light source (such as light source 520 of FIG. 5), which may then pass through a wavelength selecting device (such as wavelength selecting device 530 of FIG. 5), the optical modulator, and then through a lens element (such as first lens element 540 of FIG. 5). The optical modulator may impart a fixed spatial period (or frequency) on the light emitted from the light source. In one example, the frequency may be selected based on known or expected properties of a multilayered sample, such as the periodicity of one or more layered structures of the multilayered sample.

At 1110, method 1100 optionally includes modulating the spatial period of the first structured light signal via the optical modulator. In some examples, the spatial period may be adjusted via continuously and systematically adjusting the spatial period between a first, lower spatial period, and a second, higher spatial period. In other examples, the spatial period may be adjusting via adjusting the amplitude of the structured light between a first, lower amplitude, and a second, higher amplitude. In yet other examples, the spatial period of the first structured light signal may be modulated by adjusting directly the spatial period of the first structured light signal and by adjusting the amplitude of the first structured light signal, in certain combinations.

At 1115, method 1100 optionally includes varying the wavelength of light. In some examples, one or more specific wavelengths may be selected by using a wavelength selecting device such as a grating, liquid crystal, acousto-optic transmission filter, or tunable laser source. Additionally, by changing the wavelength of light source, the angular position of the various orders of the diffracted light will shift. Modulation of the wavelength from a lower wavelength to a longer wavelength, yields a modulation of the diffracted orders of the layered grating. By varying the wavelength, a change in the amount of power carried in the $0^{th}$ order term may be measured. Similarly, by measuring and/or imaging the $1^{st}$ order diffraction term as a function of wavelength, the apparent position of the overlay structure will appear to shift systematically as a function of wavelength. The relative shift with wavelength provides a self-referencing method for precisely determining the pitch of the overlay target; when combined with the first structured light signal, the lateral displacement may be precisely measured.

In some cases, both the $0^{th}$ order and $1^{st}$ order diffraction modes may be captured within the same field of view. The superposition of these two modes may be measured as a function of varying wavelength and structured light modulation; the structured light providing information about the spatial frequencies present in the image, and the varying wavelength changing the location of the spatial frequencies.

At 1120, method 1100 includes generating a second structured light signal via the optical modulator. The combined first structured light signal and second structured light signal may be referred to as a 2D structured light signal. The second structured light signal may generated concurrently with the first structured light signal, or may be generated at a fixed phase offset relative to the first structured light signal. Light may first be emitted via the light source, which may then pass through the wavelength selecting device, the optical modulator, and then through the lens element. The optical modulator may impart a fixed spatial period (or frequency) on the light emitted from the light source. In one example, the frequency may be selected based on known or expected properties of a multilayered sample, such as the periodicity of one or more layered structures of the multilayered sample. The spatial structure of the second structured light signal may be perpendicular to the spatial modulation of the first light structure. In other words, the component of the k-vector corresponding the spatial structure of the first structured light signal within the plane of the sample may be perpendicular to the component of the k-vector corresponding to the spatial structure of the second structured light signal in the plane of the sample. To make this work in practice, the periodicity of the second structured light source may tuned in such a way such that the amplitude of the Fourier transformed peaks are separated by more than the effective bandwidth of the sampling scheme. Overlay targets may be designed to provide vector information about overlay error. In one example, an overlay target may comprise arrays oriented perpendicular to one another which may be represented by two orthogonal wavevectors. By arranging the spatial structure of the first structured light signal parallel to one wave vector of the multilayered sample, and arranging the spatial structure of the second structured light signal parallel to the second wave vector, a vector map of the overlay error may be obtained.

At 1125, method 1100 optionally includes modulating the spatial period of the second structured light signal via the optical modulator. In some examples, the spatial period may be adjusted via continuously and systematically adjusting the spatial period between a first, lower spatial period, and a second, higher spatial period. In other examples, the spatial period may be adjusting via adjusting the amplitude of the structured light between a first, lower amplitude, and a second, higher amplitude. In yet other examples, the spatial period of the second structured light signal may be modulated by adjusting directly the spatial period of the second structured light signal and by adjusting the amplitude of the second structured light signal, in certain combinations.

At 1130, method 1100 optionally includes varying the wavelength of light. In some examples, one or more specific wavelengths may be selected by using a wavelength selecting device such as a grating, liquid crystal, acousto-optic transmission filter, or tunable laser source. Additionally, by changing the wavelength of light source, the angular position of the various orders of the diffracted light will shift. Modulation of the wavelength from a lower wavelength to a longer wavelength, yields a modulation of the diffracted orders of the layered grating. By varying the wavelength, a change in the amount of power carried in the $0^{th}$ order term may be measured. Similarly, by measuring and/or imaging the $1^{st}$ order diffraction term as a function of wavelength, the apparent position of the overlay structure will appear to shift systematically as a function of wavelength. The relative shift with wavelength provides a self-referencing method for precisely determining the pitch of the overlay target; when combined with the second structured light signal, the lateral displacement may be precisely measured.

In some cases, both the $0^{th}$ order and $1^{st}$ order diffraction modes may be captured within the same field of view. The superposition of these two modes may be measured as a function of varying wavelength and structured light modulation; the structured light providing information about the spatial frequencies present in the image, and the varying wavelength changing the location of the spatial frequencies.

At 1135, method 1100 includes projecting the structured light onto the multilayered sample. The light may be projected from the light source, through the wavelength selecting device, through the optical modulator, and through the lens element to impinge on the multilayered sample. In one example, the light projection onto the sample and subsequent collection at one or more sensors (such as first sensor 560 and second sensor 570 of FIG. 5) may be configured in a bright field illumination configuration.

At 1140, method 1100 optionally includes generating a reference signal of structured light. In some embodiments, the reference signal may be generated numerically via the computing system, and the diffracted light detected at the one or more sensors may be analyzed with respect to the numerically generated reference signal via the computing system. In other embodiments, the reference signal of the structured light may impinge on a reference surface (such as the reference surface described in relation to certain embodiments of FIG. 5). The light reflecting off of the reference surface and the light diffracted from the multilayered sample may have a definite phase relationship, which may be utilized for lock-in amplification, in order to measure the relative phase shift induced by diffraction of the structured light by the multilayered sample.

At 1145, method 1100 includes detecting a diffraction signal of the 2D structured light. In some examples, the overlay target may be designed in such a way such that the $1^{st}$ order diffracted terms carry significant amount of power and directed at a specific angle with respect to the light projected onto the sample. The system of FIG. 5 may be optimized so as to image the $1^{st}$ order terms. Light may distort, reflect, and/or diffract off of the sample, pass through one or more other lens elements (such as second lens element 565 and third lens element 575 of FIG. 5), to be received at the one or more sensors, respectively. In particular, light impinging on the multilayered sample may be diffracted by the one or more periodic structures of the multilayered sample, and one or more sensors may be positioned to detect the $1^{st}$ order diffracted structured light. The electric field of the structured light will be modulated by the periodic spatial variation of the multilayered sample's permittivity, which may then impart a phase change onto the diffracted structured light, with the phase change dependent on the periodicity of the multilayered sample's permittivity. For example, for a layered sample including a first periodic layer, and a second periodic layer of the same periodicity, but offset from the first periodic layer by a constant amount (in other words, containing an overlay error), the diffracted structured light will obtain a phase change proportional to the overlay error. By comparing the phase of the diffracted structured light to the reference signal, the overlay error may be obtained. In some examples, the periodicity of the structured light may be adjusted as described in 1110 and 1125, in order to regress on the overlay displacement. Additionally, in some examples, the wavelength of the light may be adjusted, such as via the wavelength selecting device, as described in 1115 and 1130, in order to provide an additional parameter for regression on the overlay displacement. In one example, the diffracted 2D structured light may be detected at a first sensor (such as first sensor 560 of FIG. 5) and a second sensor (such as second sensor 570 of FIG. 5), with diffracted light corresponding to the first structured light signal being detected at the first sensor, and diffracted light corresponding to the second structured light signal being detected at the third sensor.

At 1150, method 1100 optionally includes applying a lock-in technique of the $1^{st}$ order diffraction signal with respect to the reference signal to obtain overlay error. In embodiments where the reference signal is detected from structured light reflecting off of a reference surface and being detected at another sensor (such as the third sensor described in relation to FIG. 5), the reference signal may be obtained as time series data, and may be obtained on a pixel-by-pixel basis, for example. The reference signal of the structured light may have a definite phase relationship with the diffracted structured light obtained at the one or more sensors, thereby allowing a signal with the same spatial period and with a definite phase relationship to the reference signal to be obtained via lock-in amplification (such as via computing system 590 of FIG. 5). In particular, the resultant phase shift of the diffracted light obtained at the one or more sensors with respect to the reference signal may be proportional to the overlay error. In examples where the spatial period is modulated, the resultant phase shift may be analyzed as a function of spatial period (e.g., the phase shift may be analyzed in the spatial period domain in the far field), in order to obtain a phase map as a function of spatial period. In yet other examples where the wavelength of the structured light is modulated additionally or alternatively to modulation of the spatial period of the structured light, the resultant phase shift may be further analyzed as a function of wavelength, in order to obtain the phase map as a function of wavelength and/or spatial period.

At 1155, method 1100 includes analyzing the 2D diffraction signal of structured light to obtain a vector displacement of the overlay signal. Each of the diffracted first structured light signal and the diffracted second structured light signal which comprise the 2D diffraction signal may have a phase shift with respect to the reference signal (which may be measured e.g., via the lock-in amplification of 1150), with each phase shift being a function of the respective spatial frequencies and wavelengths. The phase shift of the diffracted first structured light signal with respect to the reference signal as a function of spatial period and wavelength, and the phase shift of the diffracted second structured light signal with respect to the reference signal as a function of spatial period and wavelength define the phase map, as described in 1150. By analyzing the phase map, which includes information about the phase shift of the diffracted first structured light signal with respect to the reference signal and the phase shift of the diffracted second structured light signal with respect to the reference signal, as a function of spatial period and/or wavelength, a vector displacement (in other words, an overlay error including offset errors in two perpendicular directions) of the overlay error may be obtained.

In this way, by employing spatially structured light for diffraction based overlay (DBO) metrology, it may be possible to obtain an overlay error of a multilayered sample, for a variety of measurement settings. The technical effect of employing structured light in DBO metrology is that heterodyning of the spatial period of the periodic structure of the multilayered sample and the spatial period of the structured light occurs, such that the light diffracted from the sample includes a phase shift which is directly proportional to the overlay error. By measuring the phase shift of the structured light as a function of spatial period and/or wavelength, a calibrated overlay error may then be obtained. In particular, the overlay error signature of the diffracted light may be measured using several different techniques, including via the phase shift as a function of wavelength and/or spatial period of the structured light in either of the $0^{th}$ order or the $1^{st}$ order diffraction peaks, which may be measured in either of the pupil plane or the image plane, via an asymmetry in a time series signal of the structured light, and via a vector displacement of the phase shift for 2D structured light, among others. Further, by employing heterodyning of the spatially structured light with the spatial period of the sample in order to measure the phase shift of the diffracted light, more information beyond the position and intensity of the diffraction peak may be obtained, allowing for greater sensitivity in the measurement of overlay errors as compared to conventional DBO metrology.

The disclosure provides support for a method, comprising: generating spatially structured light from a light source by projecting light emitted from the light source through an optical modulator, transmitting the spatially structured light from the optical modulator onto a multilayered periodic sample, detecting diffracted spatially structured light from the multilayered periodic sample at one or more of a plurality of sensors, the plurality of sensors communicatively coupled to a computing system, and estimating an overlay error of the multilayered periodic sample based on signals received at the computing system of the diffracted spatially structured light detected at the one or more of the plurality of sensors. In a first example of the method, the one or more of the plurality of sensors is selected from a group including: a CMOS sensor, a photodetector, a photomultiplier tube (PMT), and a charged coupled device (CCD). In a second example of the method, optionally including the first example, the light source includes at least one selected from a group including: a light emitting diode (LED), a laser, a plasma source, and a filament source. In a third example of the method, optionally including one or both of the first and second examples, the optical modulator generates spatially structured light with a given spatial period. In a fourth example of the method, optionally including one or more or each of the first through third examples, the spatial period of the spatially structured light can be modulated through amplitude modulation, frequency modulation, or a combination of both. In a fifth example of the method, optionally including one or more or each of the first through fourth examples, estimating the overlay error includes regressing over at least one of the spatial period of the spatially structured light or a wavelength of the light source. In a sixth example of the method, optionally including one or more or each of the first through fifth examples, the method further comprises: a plurality of lens elements, with a first lens element of the plurality of lens elements placed in between the optical modulator and the multilayered periodic sample, and each lens element of a remainder of the plurality of lens elements placed in between the multilayered periodic sample and the one or more sensors of the plurality of sensors, and wherein the diffracted spatially structured light detected at the one or more sensors of the plurality of sensors is compared to a reference signal. In a seventh example of the method, optionally including one or more or each of the first through sixth examples, estimating the overlay error is based on estimating an asymmetry in an electric field of the diffracted spatially structured light as a function of time. In an eighth example of the method, optionally including one or more or each of the first through seventh examples, each of the one or more of the plurality of sensors are CCDs, and wherein a phase difference between the diffracted spatially structured light and the reference signal is estimated by comparing the diffracted spatially structured light and the reference signal as a function of time and as a function of pixel positions on each of the CCDs. In a ninth example of the method, optionally including one or more or each of the first through eighth examples, estimating the overlay error includes estimating a phase difference between the diffracted spatially structured light and the reference signal via lock-in amplification of the diffracted spatially structured light with respect to the reference signal. In a tenth example of the method, optionally including one or more or each of the first through ninth examples, the method further comprises: an objective lens placed between the multilayered periodic sample and the one or more of the plurality of sensors, the objective lens projecting a spatial Fourier-transform of the diffracted spatially structured light into a pupil plane of the objective lens to be detected at the one or more of the plurality of sensors, and wherein estimating the overlay error includes applying an inverse Fourier transform to the spatial Fourier-transform of the diffracted spatially structured light detected at the one or more of the plurality of sensors. In a eleventh example of the method, optionally including one or more or each of the first through tenth examples, the spatially structured light transmitted from the optical modulator includes a two-dimensional (2D) spatial variation projected onto a plane of the multilayered periodic sample, and wherein estimating the overlay error includes estimating a vector displacement of the overlay error based on the 2D spatial variation of the diffracted spatially structured light detected at the one or more of the plurality of sensors. In a twelfth example of the method, optionally including one or more or each of the first through eleventh examples, estimating the overlay error includes estimating a phase difference of the diffracted spatially structured light with respect to the reference signal, the reference signal generated by the computing system.

The disclosure also provides support for a system for estimating overlay errors in a multilayered periodic sample, the system comprising: an axis, an optical modulator coupled with the axis, a lens element, a light source configured to shine light through the optical modulator to project spatially structured light along the axis onto the multilayered periodic sample through the lens element, a plurality of sensors configured to detect diffracted spatially structured light from the multilayered periodic sample, and a computing system including: a synchronization module configured to apply lock-in amplification of light detected at one or more of the plurality of sensors with respect to a reference signal, and an analysis module configured to compute a phase difference between the reference signal and the diffracted spatially structured light detected at the one or more of the plurality of sensors, the phase difference being a function of one or more of: a wavelength of the light source, and a spatial period of the spatially structured light. In a first example of the system, the one or more of the plurality of sensors is selected from a group including: a CMOS sensor, a photodetector, a photomultiplier tube (PMT), and a charged coupled device (CCD). In a second example of the system, optionally including the first example, the light source includes at least one selected from a group including: a light emitting diode (LED), a laser, a plasma source, and a filament source. In a third example of the system, optionally including one or both of the first and second examples, the plurality of sensors includes a first sensor configured to detect diffracted spatially structured light from the multilayered periodic sample, and a second sensor configured to detect the reference signal of the spatially structured light from the optical modulator. In a fourth example of the system, optionally including one or more or each of the first through third examples, the reference signal is generated by the computing system. In a fifth example of the system, optionally including one or more or each of the first through fourth examples, the diffracted spatially structured light detected at the first sensor is a first order diffraction signal.

The disclosure also provides support for an optical system for diffraction based overlay (DBO) metrology of a multilayered periodic sample, the optical system comprising: an axis, an optical modulator coupled to the axis, a lens element, a light source configured to shine light through the optical modulator to project spatially structured light along the axis, a beam splitter positioned between the optical modulator and the multilayered periodic sample, the beam splitter configured to reflect a first portion of the spatially structured light in a direction perpendicular to the axis, and transmit a second portion of the spatially structured light along the axis and onto the multilayered periodic sample, a reference surface configured to receive the first portion of light, and reflect the first portion of light as a reference signal to be detected at a first sensor, a second sensor configured to detect diffracted spatially structured light from the multilayered periodic sample, and a computing system including: a synchronization module configured to apply lock-in amplification of the diffracted spatially structured light at the second sensor with respect to the reference signal detected at the first sensor, and an analysis module configured to compute a phase difference between the diffracted spatially structured light detected at the second sensor with respect to the reference signal detected at the first sensor, the phase difference being a function of one or more of: a wavelength of the light source, and a spatial period of the spatially structured light.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended claims.

The invention claimed is:

1. A method, comprising:
generating spatially structured light from a light source by projecting light emitted from the light source through an optical modulator, the optical modulator imparting a selectable spatial period to the structured light;
transmitting the spatially structured light onto a multilayered periodic sample;
detecting diffracted spatially structured light from the multilayered periodic sample at at least one sensor communicatively coupled to a computing system; and
estimating an overlay error of the multilayered periodic sample based on a phase shift induced by heterodyning between the spatial period of the structured light and the periodicity of the sample, as determined from signals received at the computing system.

2. The method of claim 1, wherein the optical modulator generates spatially structured light with a given spatial period.

3. The method of claim 2, wherein the spatial period of the spatially structured light can be modulated through amplitude modulation, frequency modulation, or a combination of both.

4. The method of claim 3, wherein estimating the overlay error includes regressing over at least one of the spatial period of the spatially structured light or a wavelength of the light source.

5. The method of claim 4, further comprising a plurality of lens elements, with a first lens element of the plurality of lens elements placed in between the optical modulator and the multilayered periodic sample, and each lens element of a remainder of the plurality of lens elements placed in between the multilayered periodic sample and the at least one sensor, and wherein the diffracted spatially structured light detected at the at least one sensor is compared to a reference signal.

6. The method of claim 5, wherein estimating the overlay error is based on estimating an asymmetry in an electric field of the diffracted spatially structured light as a function of time.

7. The method of claim 5, wherein estimating the overlay error includes estimating a phase difference between the diffracted spatially structured light and the reference signal via lock-in amplification of the diffracted spatially structured light with respect to the reference signal.

8. The method of claim 4, further comprising an objective lens placed between the multilayered periodic sample and the at least one sensor, the objective lens projecting a spatial Fourier-transform of the diffracted spatially structured light into a pupil plane of the objective lens to be detected at the at least one sensor, and wherein estimating the overlay error includes applying an inverse Fourier transform to the spatial Fourier-transform of the diffracted spatially structured light detected at the at least one sensor.

9. The method of claim 4, wherein the spatially structured light transmitted from the optical modulator includes a two-dimensional (2D) spatial variation projected onto a plane of the multilayered periodic sample, and wherein estimating the overlay error includes estimating a vector displacement of the overlay error based on the 2D spatial variation of the diffracted spatially structured light detected at the at least one sensor.

10. The method of claim 5, wherein estimating the overlay error includes estimating a phase difference of the diffracted spatially structured light with respect to the reference signal, the reference signal generated by the computing system.

11. An optical system for diffraction based overlay (DBO) metrology of a multilayered periodic sample, the optical system comprising:
an axis;
an optical modulator coupled with the axis;
a lens element;
a light source configured to shine light through the optical modulator to project spatially structured light along the axis onto a multilayered periodic sample through the lens element;
a first sensor configured to detect a $0^{th}$-order diffracted component of the spatially structured light from the multilayered periodic sample;
a second sensor configured to detect a 1st-order diffracted component of the spatially structured light from the multilayered periodic sample; and
a computing system including:
a synchronization module configured to apply lock-in amplification of the detected diffracted structured light at each of the first and second sensors with respect to a reference signal; and
an analysis module configured to compute a phase difference between the reference signal and each of the diffracted structured light components detected at the first and second sensors, the phase difference being a function of the spatial period of the structured light and optionally a wavelength of the light source.

12. The method of claim 1, further comprising using a staging apparatus to position the multilayered periodic sample before and/or during a measurement.

13. The optical system of claim 11, further comprising a staging apparatus configured to position the multilayered periodic sample before and/or during a measurement.

* * * * *